(12) United States Patent
Kreuzweger et al.

(10) Patent No.: US 9,908,538 B2
(45) Date of Patent: Mar. 6, 2018

(54) RAIL VEHICLE HAVING A CONCEALED UNDERCARRIAGE

(71) Applicant: Siemens AG Österreich, Vienna (AT)

(72) Inventors: David Kreuzweger, Graz (AT); Christian Kueter, Stattegg (AT); Gerald Schobegger, Graz (AT); Martin Teichmann, Graz (AT)

(73) Assignee: Siemens AG Österreich, Vienna (AT)

( * ) Notice: Subject to any disclaimer, the term of this patent is extended or adjusted under 35 U.S.C. 154(b) by 62 days.

(21) Appl. No.: 14/900,966

(22) PCT Filed: May 15, 2014

(86) PCT No.: PCT/EP2014/059992
§ 371 (c)(1),
(2) Date: Dec. 22, 2015

(87) PCT Pub. No.: WO2014/206643
PCT Pub. Date: Dec. 31, 2014

(65) Prior Publication Data
US 2016/0152248 A1    Jun. 2, 2016

(30) Foreign Application Priority Data

Jun. 26, 2013    (AT) .............................. A 50421/2013

(51) Int. Cl.
*B61D 17/00* (2006.01)
*B61D 17/02* (2006.01)
(52) U.S. Cl.
CPC ............... *B61D 17/02* (2013.01); *Y02T 30/32* (2013.01)

(58) Field of Classification Search
CPC .......... B61D 17/00; B61D 17/02; Y02T 30/32
See application file for complete search history.

(56) References Cited

U.S. PATENT DOCUMENTS 6,321,659 B1 *  11/2001  Gelbert ................. B61D 17/02
                                                 105/1.1
2011/0297035 A1 * 12/2011  Langerwisch ......... B61D 17/02
                                                 105/1.1
(Continued)

FOREIGN PATENT DOCUMENTS

CN      201998993         10/2011
DE        726181 C        10/1942
(Continued)

OTHER PUBLICATIONS

Office Action dated Dec. 27, 2016 which issued in the corresponding Chinese Patent Application No. 201480036176.0.

*Primary Examiner* — Jason C Smith
(74) *Attorney, Agent, or Firm* — Cozen O'Connor

(57) ABSTRACT

A rail vehicle includes a concealed undercarriage, particularly a bogie, wherein the covering or fairing comprises at least side elements that are arranged along the rail vehicle on the sides of the undercarriage and a bottom element that is arranged on the underside of the undercarriage, where the side elements are fixedly connected to the carriage body of the rail vehicle, the bottom element is fixedly connected to the undercarriage, and a gap is provided between the bottom element on one side and the side elements on the other side, and where the gap provides a distance between the wheels of the undercarriage and the bottom element on one side and the side elements on the other side, both in the fully turned and in the partially turned state of the undercarriage.

18 Claims, 4 Drawing Sheets

(56) References Cited

U.S. PATENT DOCUMENTS

| | | | | |
|---|---|---|---|---|
| 2013/0133545 A1* | 5/2013 | Schober | ............... | B61D 17/02 |
| | | | | 105/1.1 |
| 2013/0239844 A1* | 9/2013 | Schober | ............... | B61D 17/02 |
| | | | | 105/1.2 |
| 2013/0291758 A1* | 11/2013 | Orellano | ............... | B61D 17/02 |
| | | | | 105/1.1 |
| 2013/0291759 A1* | 11/2013 | Orellano | ............... | B61D 17/02 |
| | | | | 105/1.1 |
| 2014/0238261 A1* | 8/2014 | Hidai | ................. | B61D 17/02 |
| | | | | 105/1.2 |
| 2015/0144026 A1* | 5/2015 | Kreuzweger | ............ | B61F 5/08 |
| | | | | 105/453 |
| 2016/0152248 A1* | 6/2016 | Kreuzweger | ......... | B61D 17/02 |
| | | | | 105/1.1 |

FOREIGN PATENT DOCUMENTS

| | | |
|---|---|---|
| DE | 2542780 A1 | 4/1977 |
| DE | 102010061718 A1 | 5/2012 |
| EP | 0057765 A1 | 8/1982 |
| EP | 2428422 A1 | 3/2012 |
| JP | 2006-290054 | 10/2006 |
| SU | 312773 | 8/1971 |
| WO | WO 2010086201 A1 | 8/2010 |
| WO | WO 2012/069269 | 5/2012 |

* cited by examiner

RAIL VEHICLE HAVING A CONCEALED UNDERCARRIAGE

CROSS-REFERENCE TO RELATED APPLICATIONS

This is a U.S. national stage of Application No. PCT/EP2014/059992 filed 15 May 2014. Priority is claimed on Austrian Application No. A50421/2013, filed Jun. 26, 2013, the content of which is incorporated herein by reference in its entirety.

BACKGROUND OF THE INVENTION

1. Field of the Invention

The invention relates to a rail vehicle having a concealed undercarriage, in particular a bogie, where the fairing comprises side elements that are arranged along the rail vehicle on the sides of the undercarriage and a bottom element that is arranged on the underside of the undercarriage.

The invention can be applied to bogies, in particular to internally supported bogies, where the axle bearings and the frame parts are situated between the wheels and/or the wheel discs.

2. Description of the Related Art

The running resistance of trains, particularly high-speed trains, is largely determined by the aerodynamic running resistance. A significant portion of this aerodynamic running resistance stems from the resistance of the underbody of the rail vehicle, in particular the spaces that are required for the movement of the undercarriage beneath the car bodies.

These spaces are also disadvantageous with respect to the acoustic properties of rail vehicles.

In order to bring about improvements in this regard, the normal practice is to attach aprons to the sides of the bogie of the rail vehicle.

Moreover, WO 2010/086201 A1 discloses a design of the fairing in the form of a peripheral wall for surrounding the bogie, and a fastening device for rotationally guiding the peripheral wall at its upper edge on a car body of the rail vehicle, such that the rotation of the peripheral wall corresponds to the rotation of the bogie in each case. The fairing is covered at the lower edge of the peripheral wall by an underbody-like terminating part, which has fasteners for its attachment to the bogie. Here, the aprons are therefore formed rotatable relative to the car body, and the underbody-like terminating part is likewise connected to the axle bearings or bogie frame.

WO 2012/069269 A1 also discloses a rail vehicle having a concealed undercarriage, where the lateral fairing elements follow the movement of the bogie and in conjunction with a bottom element provide an integral complete fairing of the bogie.

The conventional aprons that are attached to the sides of the bogie of the rail vehicle ignore the aerodynamic properties of the underside of the undercarriage. The rotatable lateral fairing elements and likewise rotatable bottom element involve a sophisticated suspension of the lateral fairing elements and reduce the running stability due to their comparatively high moment of inertia about the vertical axis of the undercarriage.

SUMMARY OF THE INVENTION

In view of the foregoing, it is therefore an object of the present invention to provide a rail vehicle having a concealed undercarriage, which allows a simple construction of the side elements while also allowing the underside of the undercarriage to be covered.

This and other objects and advantages are achieved in accordance with the invention by a rail vehicle having at least a concealed undercarriage where the fairing comprises at least side elements that are arranged along the rail vehicle on the sides of the undercarriage and a bottom element that is arranged on the underside of the undercarriage.

In accordance with the invention, the side elements are fixedly connected to the car body of the rail vehicle, the bottom element is fixedly connected to the undercarriage, and a gap is provided between each of the bottom element and the side elements, where the gap allows for a clearance between the wheels of the undercarriage and both the bottom element and the side elements, in both the partially turned and fully turned states of the undercarriage.

By virtue of the side elements being fixedly connected to the car body of the rail vehicle, they are easy to install. They can also be formed in a structurally simpler manner in comparison with rotatable side elements, because they are exposed to less acceleration than rotatable side elements. The side elements are usually integrated in the side fairing of the overall car body so as to be flush therewith. In this case, it can be advantageous for both the side elements and the bottom element to be formed so as to be easily uninstalled or folded open for maintenance purposes.

With the exception of the inventive clearances, the side elements are flush with the fairing of the rail vehicle longitudinally in front of and behind the wheels. The clearances between side elements and wheels or bottom plate, which are required for movement, are therefore screened in terms of flow dynamics by those regions of the side elements that are arranged in front of them in a direction of flow or travel.

By virtue of the connection of the side elements to the car body, the side elements likewise do not adversely influence the running stability of the undercarriages, and as fixed parts they can also be optimized more easily and economically in terms of flow dynamics.

In an embodiment, the side element is configured to extend downwards so as to cover at least half of the wheel surface of the undercarriage when viewed from the side.

The bottom element aerodynamically encloses the underside of the undercarriage It is only necessary to leave sufficient clearance between the bottom element and side elements to allow the wheels of the undercarriage to turn without being impeded, and for the undercarriage to perform all of its intended movements during operation. With regard to aerodynamics, this slot-like space is ideally located in the region of influence of the wheel turbulence, such that the gap does not cause any additional turbulence of the air elsewhere. In an exemplary embodiment, the gap can therefore be arranged to a large extent next to the wheels, i.e., outside the wheels.

In a further advantageous layout of this space, the gap is positioned in the wind shadow of the wheels, because this region also lies in the region of influence of the wheel turbulence.

Otherwise, it appears advantageous to form this transverse gap in the immediate vicinity of the wheels generally, because it is thereby possible to realize an appropriate air supply for the wheels and brakes and therefore a corresponding cooling.

The bottom element has barely any adverse effect on the running stability of the undercarriage because its mass, relative to a full fairing that is attached to the bogie, has a limited radius of gyration about the vertical axis.

If the undercarriage is a bogie, this may be formed such that the lower edge of the side elements, in longitudinal regions that are closer to the axis of rotation of the bogie, extends further towards the bottom element than the lower edge in longitudinal regions that are further from the axis of rotation.

In the case of a two-axle undercarriage, e.g., the lower edge of the side elements can extend further towards the bottom element between the wheels of different wheel axles than in the longitudinal region of the wheels, because the axis of rotation of the undercarriage is situated between the wheel axles.

In the particular case of internally supported undercarriages, provision can be made for the side elements to comprise convex bulges for spring elements and/or damping elements (such as pneumatic springs or hydraulic hunting dampers). In other respects, for reasons of flow dynamics, there should be little or no change in the cross section of the side elements over the length.

The car body is often wider than the axle length and the side walls are flush with the fairing of the car body. Consequently, it can be beneficial for the side elements below the car body to be curved inwards towards the bottom element.

In order to provide as complete a fairing as possible for the undercarriage, provision can be made for the bottom element to comprise recesses for the wheels and otherwise normally to extend across the undercarriage as far as the outside of the wheels. If the inventive gap is situated largely or completely in the wind shadow of the wheels, the bottom element is correspondingly shorter in a transverse direction. Here, provision can then be made for the bottom element to have recesses for the wheels and otherwise to extend across the undercarriage at least as far as the inside of the wheels. The bottom element is always arranged vertically below the wheel axles.

In the simplest case, the bottom element can be configured as a largely flat plate having an essentially rectangular shape, for example. The edges of the bottom element can also be adapted to the optimal airflow in the region of the gaps, e.g., by being rounded or bent upwards.

Furthermore, provision can be made for the bottom element to have at least one opening through which components project.

Components here are understood to be motors, transmissions or bearings, for example. More structural space is therefore available for these components, and the components are cooled by the air stream. In order to ensure that these openings do not excessively compromise the aerodynamic properties of the bottom element, the edges of the opening may be formed aerodynamically flush with the components.

Moreover, in order additionally to achieve an aerodynamically favorable transition from the bottom element to the car body fairing, provision can be made for the fairing to comprise a transition element which is fixedly connected to the car body and connects the bottom element to the car body fairing in a manner which is aerodynamically flush. For example, the edge of the bottom element may be covered by a ramp-shaped transition element, in a flow direction towards the base of the car body, which also ensures a favorable flow of air during all operational suspension travel of the undercarriage.

In this case, the transition element may be formed wider, on its side which faces towards the bottom element, than the bottom element. A favorable flow is thereby achieved even when the undercarriage is fully turned.

It should be understood the disclosed embodiments of the invention must ensure the clearance gauge is not contravened. A clearance gauge takes the form of a defined structure clearance, which is usually specified for the perpendicular transverse plane of a route, comprising railroad tracks in this case. The clearance gauge stipulates the "clear space" that must be preserved by objects on the route, and also serves as a structural parameter for the dimensioning of rail vehicles. The rail vehicles must not exceed the prescribed limit lines in cross section, where it must also be considered whether, assuming a particular length, they also remain within the clearance gauge in curves. The various vehicle gauges are regulated in a country-specific manner and are defined, for example, in the UIC guidance notes for the UIC region of the International Union of Railroads. With respect to the gauges that apply here, the inventive fairing combined with an internally supported undercarriage represents a particularly advantageous embodiment, because the side elements fit particularly well against the contour of the side fairing of the remaining car body in a longitudinal direction. In this case, bulges or cutouts in the side elements for the wheelset bearings, which might be required in the case of externally supported bogies, can be avoided.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In order to explain the invention further, reference is made in the following part of the description to the figures, from which further advantageous embodiments, details and developments of the invention may be derived, in which.

DETAILED DESCRIPTION OF THE EXEMPLARY EMBODIMENTS

Figure 1:
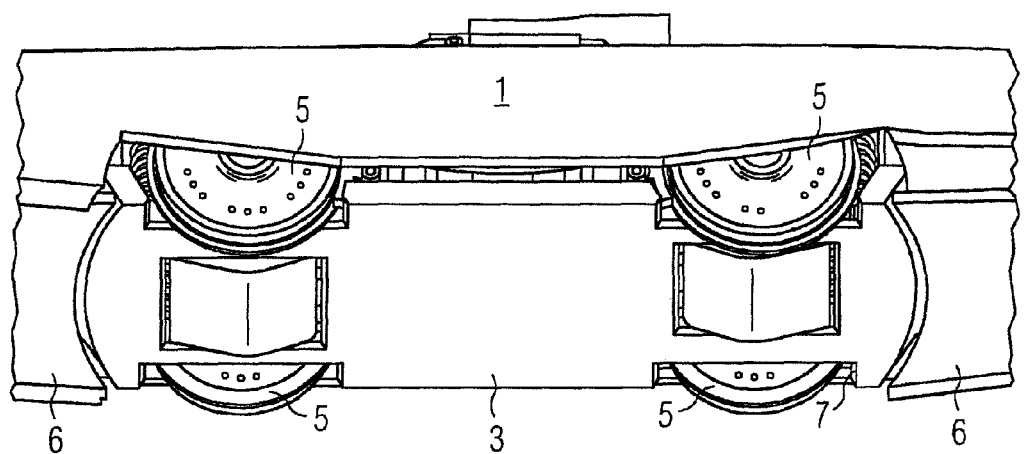
FIG. 1 shows a perspective view from the side and below of a concealed undercarriage in accordance with the invention.

FIG. 1 illustrates a perspective view from the side and below of a concealed undercarriage. Here, a side element 1, a bottom element 3 configured as a flat bottom plate, and two transition elements 6 can be seen, and which conceal the undercarriage that is formed as a bogie. The side element 1 on the rear side of the undercarriage is not visible here. Of the undercarriage, only the wheels 5 are partially visible.

Apart from the rectangular recesses 7 on its straight longitudinal edges and the arc-shaped rounding off at its ends, the bottom element 3 is essentially rectangular. The transition elements 6 adjoin the bottom element 3 on both sides, only an arc-shaped narrow gap being present between the arc-shaped ends of the bottom element 3 and the likewise arc-shaped transition element 6.

Figure 2:
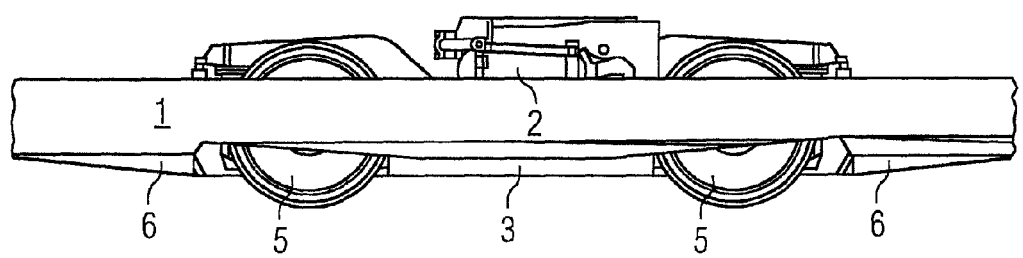
FIG. 2 shows a side view of the undercarriage of FIG. 1.

In FIG. 2, where a further part of the undercarriage 2 is visible as a result of omitting the car body and its fairing, it can be seen that the lower contour of the bottom element 3 is continued via the arc-shaped gap in the lower contour of the transition element 6 without any offset in a vertical direction. The lower contour of the transition element 6 then rises in the form of a ramp, before merging as smoothly as possible into the underbody (not shown) of the car body.

The lower contour of the side element 1 rises in the region of the wheels 5 as the distance increases from the axis of rotation of the bogie, and after the wheels 5 drops back down to the same height as between the wheels 5 of a side. The car body would cover a further part of the wheels 5 above the wheel axles, in a vertical direction, while the side elements 1 arranged on the car body then cover a region extending below the wheel axles of the wheels 5. The side element 1 therefore extends so far downwards that it (with the fairing of the car body which is not shown here) covers more than half of the surface area of the two wheels 5 on this side of the undercarriage 2.

Figure 3:
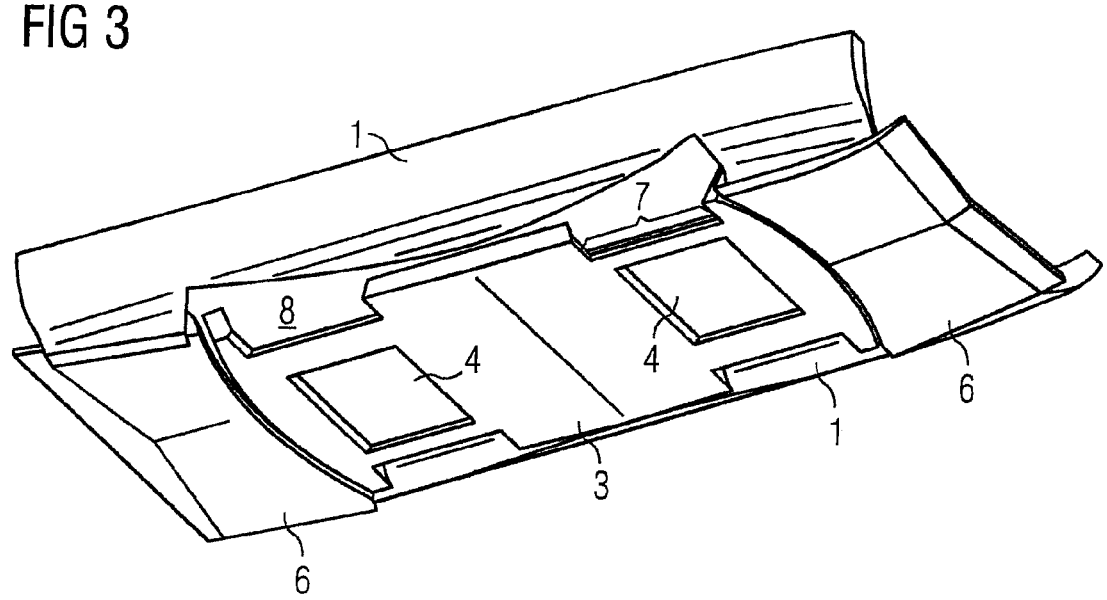
FIG. 3 shows the fairing parts of FIGS. 1 and 2.

Only the fairing parts 1, 3 and 6 from FIGS. 1 and 2 are illustrated in FIG. 3. Here, it is readily apparent that the lower edge of the side elements 1 extends further towards the bottom element 3 at its center than in the region of the recesses 7 for the wheels 5. The width of the gap between the side element 1 and the bottom element 3 increases slowly from the center of the bottom element 3 and then decreases rapidly again after the recess 8 to approximately its measurement at the center of the bottom element 3. This measurement is formed as small as possible in structural terms. However, it must nonetheless allow the transverse movements of the bogie.

In the region of the wheel axles, the bottom element 3 here has an opening 4 in each case, through which a component can project downwards beyond the bottom element 3. The transition from the underside of the bottom element 3 to this component is ideally set to be as gradual as possible, in order to prevent the formation of turbulence here.

It can also be seen that the bottom element 3 has at its ends a curved longitudinal gap relative to the car body fairing, i.e., the transition element 6, where the gap has a width that is virtually unchanged when the bogie turns, specifically because both the bottom element 3 at its longitudinal ends and the transition elements 6 at their sides facing the bottom element 3 are formed to be arc-shaped (concentric to the axis of rotation of the bogie) here.

Figure 4:
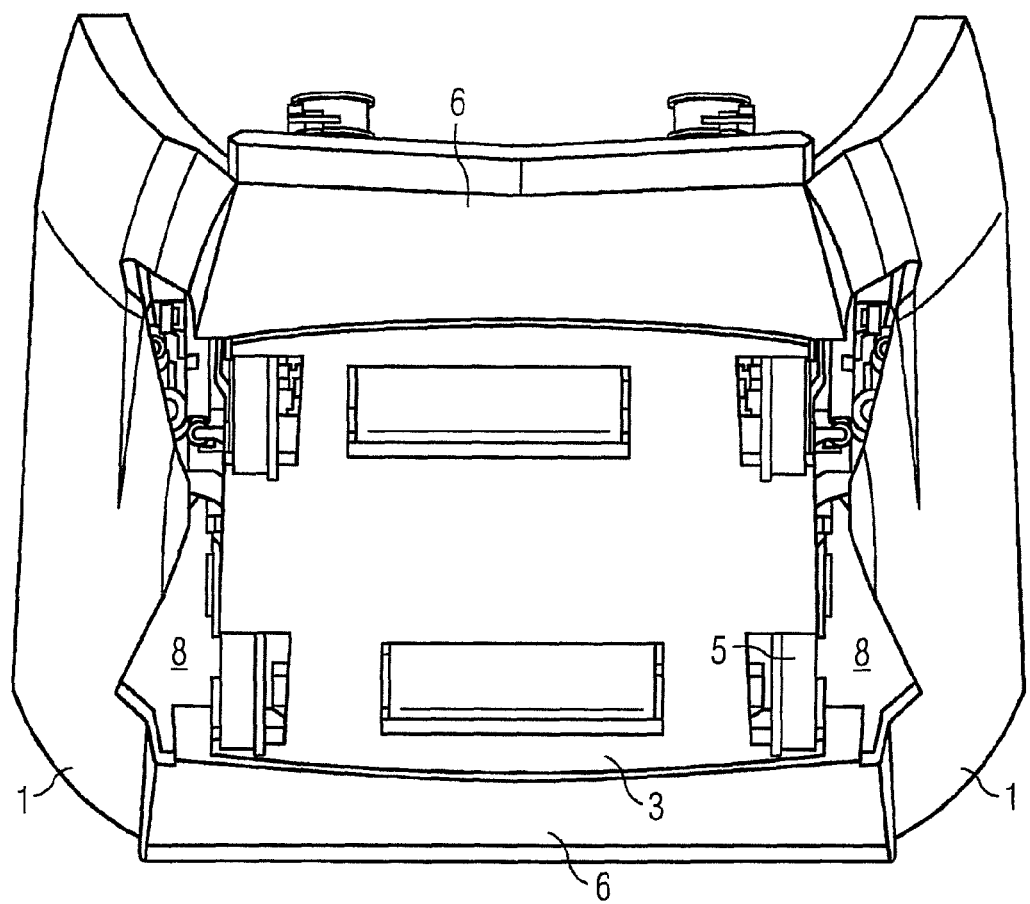
FIG. 4 shows a perspective view from behind and below of a concealed undercarriage in accordance with the invention.

FIG. 4 illustrates a perspective view from behind and below of the concealed undercarriage. Here, it is apparent the width of the transition element 6 decreases with distance from the bottom element 3, and the side elements 1 go further inwards correspondingly to adjoin the transition elements 6 directly at their sides. The gaps 8 between the bottom element 3 (and the wheels 5) and the side elements 1 widen in the direction of travel: the gap 8 is narrower between the wheels 5 of different wheel axles than in the longitudinal region of the wheels 5. Both gaps 8 (covering all four wheels 5) therefore together form an X-shaped layout.

Figure 5:
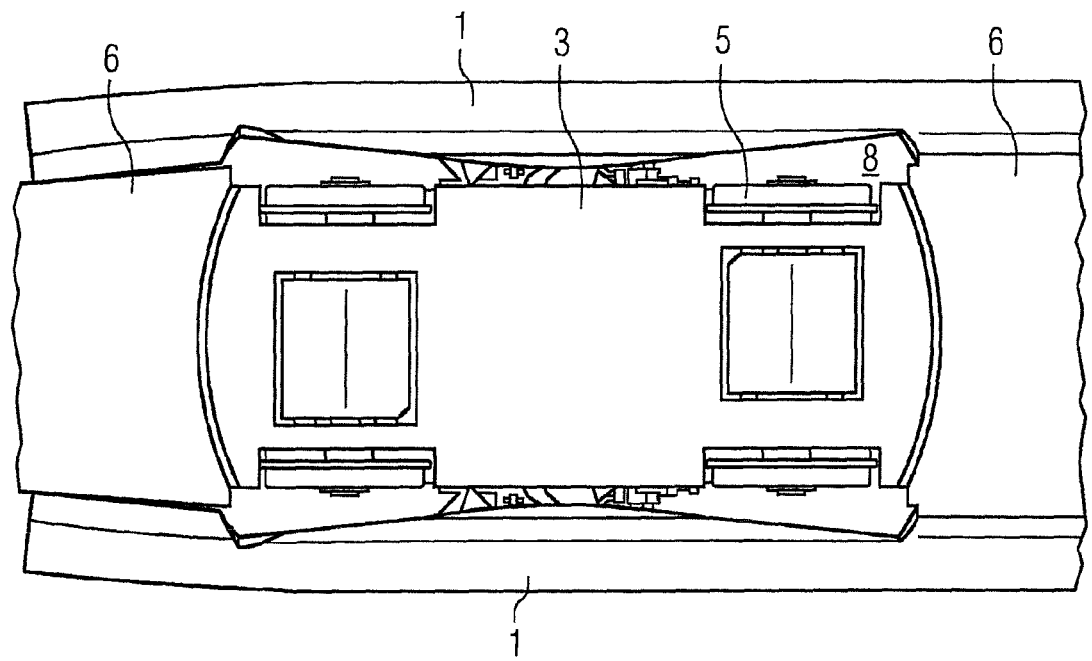
FIG. 5 shows a bottom view of a concealed undercarriage in accordance with the invention.

FIG. 5 again illustrates the concealed undercarriage in a bottom view, and still without the car body.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A rail vehicle having a concealed undercarriage, comprising:
a fairing including side elements arranged along the rail vehicle on sides of the undercarriage and fixedly connected to a car body of the rail vehicle; and
a bottom element arranged on an underside of the undercarriage and fixedly connected to the undercarriage, and
wherein a gap is provided between the bottom element and the side elements respectively, said gap ensuring a clearance between wheels of the undercarriage and (i) the bottom element and (ii) the side elements when the undercarriage is at least one of partially turned and fully turned; and
wherein the bottom element extends in a transverse direction of the undercarriage as far as an inside of the wheels.

2. The rail vehicle as claimed in claim 1, wherein the gap is substantially outside the wheels.

3. The rail vehicle as claimed in claim 1, wherein the gap is located in a wind shadow of the wheels.

4. The rail vehicle as claimed in claim 2, wherein the gap is located in a wind shadow of the wheels.

5. The rail vehicle as claimed claim 1, wherein, when the undercarriage is a bogie, a lower edge of the side elements in longitudinal regions which are closer to an axis of rotation of the bogie extends further towards the bottom element than the lower edge in longitudinal regions which are further from the axis of rotation.

6. The rail vehicle as claimed in claim 1, wherein the side elements have convex bulges for accommodating at least one of (i) spring elements and (ii) damping elements.

7. The rail vehicle as claimed in claim 1, wherein side elements below the car body are curved inwards towards the bottom element.

8. The rail vehicle as claimed in claim 1, wherein the bottom element includes recesses for the wheels.

9. The rail vehicle as claimed in claim 1, wherein the bottom element comprises a substantially flat plate.

10. The rail vehicle as claimed in claim 1, wherein the bottom element includes at least one opening through which components project.

11. The rail vehicle as claimed in claim 10, wherein edges of the opening are formed aerodynamically flush with the components.

12. The rail vehicle as claimed in claim 1, wherein the fairing comprises a transition element which is fixedly connected to the car body and connects the bottom element to the car body fairing in an aerodynamically flush manner.

13. The rail vehicle as claimed in claim 12, wherein the transition element is wider, on a side which faces towards the bottom element, than the bottom element.

14. The rail vehicle as claimed in claim 1, wherein the bottom element includes, at its ends, a curved longitudinal gap relative to the car body fairing, said gap having a width which is virtually unchanged when the concealed under carriage turns.

15. The rail vehicle as claimed in claim 14, wherein the concealed undercarriage comprises a bogie.

16. The rail vehicle as claimed in claim 14, wherein said curved longitudinal gap relative to the car body fairing comprises a transition element.

17. The rail vehicle as claimed in claim 1, wherein the side element is formed to extend downwards to an extent so as to cover at least half of a wheel surface of the undercarriage when viewed from the side.

18. The rail vehicle as claimed in claim 1, wherein the concealed undercarriage comprises a bogie.

* * * * *